US008086530B2

(12) United States Patent  
Resnick et al.

(10) Patent No.: US 8,086,530 B2  
(45) Date of Patent: Dec. 27, 2011

(54) ELECTRONIC PAYMENT SYSTEM UTILIZING INTERMEDIARY ACCOUNT

(75) Inventors: David Resnick, Portland, OR (US); Matt J. Callanan, Portland, OR (US)

(73) Assignee: Precash, Inc., Houston, TX (US)

( * ) Notice: Subject to any disclaimer, the term of this patent is extended or adjusted under 35 U.S.C. 154(b) by 1106 days.

(21) Appl. No.: 09/734,988

(22) Filed: Dec. 11, 2000

(65) Prior Publication Data

US 2001/0001321 A1   May 17, 2001

Related U.S. Application Data

(62) Division of application No. 09/442,620, filed on Nov. 17, 1999, now Pat. No. 6,185,545.

(60) Provisional application No. 60/108,762, filed on Nov. 17, 1998, provisional application No. 60/141,994, filed on Jul. 1, 1999.

(51) Int. Cl.
*G06Q 40/00* (2006.01)
(52) U.S. Cl. .......................................................... 705/39
(58) Field of Classification Search .................. 705/39, 705/41, 35, 43, 40, 44, 16, 17, 77, 42
See application file for complete search history.

(56) References Cited

U.S. PATENT DOCUMENTS

| | | | |
|---|---|---|---|
| 5,068,891 A | 11/1991 | Marshall | 379/91 |
| 5,144,649 A | 9/1992 | Zicker et al. | 379/59 |
| 5,359,182 A | 10/1994 | Schilling | 235/380 |
| 5,440,621 A | 8/1995 | Castro | 379/112 |
| 5,465,206 A | 11/1995 | Hilt et al. | |
| 5,504,808 A | 4/1996 | Hamrick, Jr. | 379/144 |
| 5,511,114 A | 4/1996 | Stimson et al. | 379/114 |
| 5,577,109 A | 11/1996 | Stimson et al. | 379/112 |
| 5,621,787 A | 4/1997 | McKoy et al. | 379/144 |
| 5,640,447 A | 6/1997 | Fonseca | 379/144 |
| 5,649,118 A * | 7/1997 | Carlisle et al. | 705/41 |
| 5,673,309 A * | 9/1997 | Woynoski et al. | 379/144 |
| 5,677,955 A | 10/1997 | Doggett et al. | |
| 5,696,908 A * | 12/1997 | Muehlberger et al. | 705/39 |
| 5,704,046 A * | 12/1997 | Hogan | 705/39 |
| 5,721,768 A * | 2/1998 | Stimson et al. | 379/114.16 |
| 5,777,305 A | 7/1998 | Smith et al. | |
| 5,778,067 A | 7/1998 | Jones et al. | |
| 5,794,221 A | 8/1998 | Egendorf | |
| 5,812,643 A * | 9/1998 | Schelberg, Jr. et al. | 379/93.12 |

(Continued)

FOREIGN PATENT DOCUMENTS

EP   0950968 A1   10/1999

(Continued)

OTHER PUBLICATIONS

Internet: eBANX: www.ebanx.com/how_ it_works.html.

(Continued)

*Primary Examiner* — Elda Milef  
(74) *Attorney, Agent, or Firm* — Brunell IP, PC

(57) ABSTRACT

Payments in cash are submitted to a merchant at a point of sale. The payment transaction is effected electronically to credit the end user's intermediary account. Subsequent electronic communications between the intermediary account and a vendor site effect payment to the vendor for goods or services on behalf of the end user. This system leverages the existing credit card payment system in reverse so as to provide the convenience of submitting cash payments at a multitude of merchant locations.

23 Claims, 9 Drawing Sheets

U.S. PATENT DOCUMENTS

| | | | | |
|---|---|---|---|---|
| 5,828,740 A | * | 10/1998 | Khuc et al. | 379/114.2 |
| 5,854,975 A | * | 12/1998 | Fougnies et al. | 455/408 |
| 5,864,830 A | | 1/1999 | Armetta et al. | |
| 5,869,826 A | | 2/1999 | Eleftheriou | |
| 5,899,980 A | | 5/1999 | Wilf et al. | |
| 5,903,633 A | | 5/1999 | Lorsch | |
| 5,907,832 A | | 5/1999 | Pieterse et al. | |
| 5,913,203 A | | 6/1999 | Wong et al. | 705/39 |
| 5,914,471 A | | 6/1999 | Van De Pavert | |
| 5,915,007 A | * | 6/1999 | Klapka | 379/144 |
| 5,926,796 A | | 7/1999 | Walker et al. | 705/16 |
| 5,946,669 A | | 8/1999 | Polk | |
| 5,949,880 A | | 9/1999 | Curry et al. | |
| 5,963,924 A | | 10/1999 | Williams et al. | |
| 5,974,146 A | | 10/1999 | Randle et al. | |
| RE36,365 E | * | 11/1999 | Levine et al. | 235/380 |
| 5,991,381 A | | 11/1999 | Bouanaka et al. | |
| 6,000,608 A | * | 12/1999 | Dorf | 235/380 |
| 6,012,048 A | | 1/2000 | Gustin et al. | |
| 6,014,636 A | | 1/2000 | Reeder | |
| 6,028,920 A | * | 2/2000 | Carson | 379/114.2 |
| 6,047,267 A | * | 4/2000 | Owens et al. | 705/34 |
| 6,047,270 A | | 4/2000 | Joao et al. | |
| 6,246,755 B1 | * | 6/2001 | Walker et al. | 379/114.2 |
| 6,282,522 B1 | | 8/2001 | Davis et al. | |
| 6,408,284 B1 | | 6/2002 | Hilt et al. | |
| 6,473,500 B1 | * | 10/2002 | Risafi et al. | 379/144.01 |
| 6,575,361 B1 | | 6/2003 | Graves et al. | |
| 6,648,222 B2 | | 11/2003 | McDonald et al. | |
| 6,651,885 B1 | | 11/2003 | Arias | |
| 6,918,537 B2 | | 7/2005 | Graves et al. | |
| 7,028,891 B2 | | 4/2006 | O'Neal | |
| 7,083,084 B2 | | 8/2006 | Graves et al. | |
| 7,093,761 B2 | | 8/2006 | Smith et al. | |
| 7,107,243 B1 | | 9/2006 | McDonald et al. | |
| 7,165,052 B2 | | 1/2007 | Diveley et al. | |
| 7,292,998 B2 | | 11/2007 | Graves et al. | |
| 7,311,249 B2 | | 12/2007 | Smith et al. | |
| 7,328,190 B2 | | 2/2008 | Smith et al. | |
| 7,333,955 B2 | | 2/2008 | Graves et al. | |
| 7,437,328 B2 | | 10/2008 | Graves et al. | |
| 7,578,439 B2 | | 8/2009 | Graves et al. | |
| 7,752,095 B1 | | 7/2010 | Laracey et al. | |
| 2001/0025257 A1 | | 9/2001 | Sato | |
| 2002/0035548 A1 | | 3/2002 | Hogan et al. | |
| 2002/0116331 A1 | | 8/2002 | Cataline et al. | |
| 2003/0093281 A1 | | 5/2003 | Geilhufe et al. | |
| 2003/0191711 A1 | | 10/2003 | Jamison et al. | |
| 2003/0204457 A1 | | 10/2003 | Arias | |
| 2004/0122766 A1 | | 6/2004 | Brooks et al. | |
| 2004/0123129 A1 | | 6/2004 | Ginter et al. | |
| 2004/0158746 A1 | | 8/2004 | Hu et al. | |
| 2005/0010523 A1 | | 1/2005 | Myklebust et al. | |
| 2007/0150414 A1 | | 6/2007 | Templeton | |
| 2007/0187492 A1 | | 8/2007 | Graves et al. | |
| 2008/0133266 A1 | | 6/2008 | Allen | |

FOREIGN PATENT DOCUMENTS

| | | | |
|---|---|---|---|
| WO | 91/10976 | * | 7/1991 |

OTHER PUBLICATIONS

International Search Report dated May 25, 2000, from the International Searching Authority for corresponding PCT Application No. PCT/US99/27407.

Hester et al., "Industry Corner: Smart Cards for an Information Hungry World", Business Economics, V33, No. 1, Jan. 1998, pp. 54-58.

Hisey, Pete, "Looking for the Pot of Gold", Credit Card Management, V10, No. 4, Jul. 1997, pp. 50-58.

Rouland, Renee C., "The Talk of the Towns", Discount Merchandiser, V36, No. 3 Mar. 1996, pp. 26-30.

Allen, Catherine, "Get Smart. (Smart Cards and the Virtual Bank)", Bank Management, vol. 71, No. 2, Mar. 13, 1995, pp. 58-62.

Fairhurst, Gorry, "Local Area Network", Jan. 10, 2001, Retrieved from the website: http://www.erg.abdn.ac.uk/users/gorry/course/intro-pages/lan.html.

Hutton, David, "Attack of the Smart Cards", Bank Marketing, vol. 30, No. 2, Feb. 1998, pp. 40-46.

"USA Technologies & IBM Jointly Offer Cashless Hotel Room Key-Card Vending Solution", Hospitality Net-Article, Jun. 26, 2002, 3 pages.

Worhington, Steve, "The Cashless Society", International Journal of Retail and Distribution Management, vol. 23, No. 7, 1995, pp. 31-40.

* cited by examiner

ELECTRONIC PAYMENT SYSTEM UTILIZING INTERMEDIARY ACCOUNT

RELATED APPLICATION DATA

This application is a division of U.S. patent application Ser. No. 09/442,620, filed Nov. 17, 1999 now U.S. Pat. No. 6,185,545, which is a continuation of U.S. Provisional Application No. 60/108,762 filed Nov. 17, 1998 and is a continuation of U.S. Provisional Application No. 60/141,994 filed Jul. 1, 1999; both prior applications are hereby incorporated by reference. Applicant claims, as to both prior applications, the right of priority pursuant to the Paris Convention and 35 USC §119.

TECHNICAL FIELD

The present invention relates to methods and apparatus for making payments for the purchase of goods or services. Specifically, the invention provides for receiving payments in cash or by other means, at any of a number of convenient locations, such as merchant point-of-sale locations, and includes means for electronically crediting a selected end-user account in response to the payment. An intermediate account is provided in between the payment side and the vendor account side, offering advantages in terms of performance, accounting, credit risk allocation, convenience and user anonymity.

BACKGROUND OF THE INVENTION

Various means are known for paying for goods or services, the most fundamental method being payment in cash at the time and place of the purchase. Credit cards and debit cards are widely used for convenience in making purchases as the user need not carry cash and risk losing it or having it stolen. Credit card accounts also are used to extend credit to a user or cardholder, although card issuers are known to suffer substantial credit losses. One way for vendors of goods or services to avoid credit losses and reduce collection problems is to establish "pre-paid" accounts. A pre-paid account, as the name implies, requires that the user pay for selected goods or services in advance; subsequent delivery of the goods or services is charged against the pre-paid account by debiting the user's balance. The problem here is that adding value to or "recharging" pre-paid vendor accounts is not convenient.

Pre-paid wireless (cell phone) service provides an illustrative example. Pre-paid wireless service enables customers to utilize the convenience of cellular and digital communications by establishing a prepaid account with a wireless telecommunications vendor. Typically, prepaid wireless cards, each card corresponding to a wireless services account, are purchased in preset denominations in a limited number of locations. The cards are issued in fixed value increments, for example, $20, $50 or $100. Each card provides the end-user with a specified amount of wireless calling dollars or minutes. After the initial allocation is exhausted (or before), the user can "recharge" or reload their wireless account usually by calling an 800 number, having a credit card handy, and either talking with a customer service representative (CSR) or using an automated system to charge additional minutes to the credit card. This system is burdensome to both the user and the wireless carrier. Moreover, some users have pre-paid wireless accounts because of credit problems and thus may not have a valid credit card available for this purpose.

A new method for affecting payment for wireless telecommunications services, as well as other goods and services, is needed that enables a customer to purchase variable amounts of value for loading onto the customer's account. A new system should allow making such payments at convenient locations. And a new payment system should allow a user to affect bill payment or otherwise purchase goods and services, for example from a remote vendor, without the need to establish good credit in advance. It is also desirable that a payment system provide anonymity especially for dealing with remote vendors, yet physical separation of purchaser and vendor, the "card holder not present" scenario, is known to contribute to credit card fraud losses. The use of cash addresses some of these problems, but it is not practical for remote vendors.

SUMMARY OF THE INVENTION

A primary aspect of the present invention is directed to providing a stored value intermediary account to implement a centralized payment system. The centralized payment system interfaces with merchant points-of-sale where cash payments (or other forms of payments) are received from the end-user (or his agent). The present invention leverages the existing financial network that is used around the world for credit card transactions, but it uses that existing system "backwards" in that payments are received, rather than credit extended, at the merchant point-of-sale. Interfacing to the existing worldwide network, e.g. VisaNet or another card association network, in this new way allows payments to be received at any of literally millions of merchant locations that are coupled to the network, thus providing extraordinary convenience for the end-user. The payments are posted to an intermediary account maintained on the centralized payment system. Thus an important feature of the present invention is the use of a ubiquitous standards-based electronic system for recharging (adding value to) end-user accounts from retail point-of-sale terminals.

Another aspect of the invention focuses on the payment side of the system; namely, effecting an electronic payment from the central intermediary account to a wireless carrier or other vendor on behalf of the end-user. A further advantage in this regard is security and anonymity because no personal information about the end-user, not even the user's name, need be stored in the central intermediary payment system.

Additional objects and advantages of this invention will be apparent from the following detailed description of preferred embodiments thereof which proceeds with reference to the accompanying drawings. In the detailed description, we use wireless services as an example of goods or services that can be paid for using the new centralized payment system. Wireless services are merely illustrative and are used as a convenient way to describe the invention; it can be used to pay for any goods or services.

BRIEF DESCRIPTION OF THE DRAWINGS

The foregoing aspects and the attendant advantages of this invention will become more readily appreciated through reference to the following detailed description, when read and considered in conjunction with the accompanying drawings, wherein.

DETAILED DESCRIPTION OF A PREFERRED EMBODIMENT

Figure 1:
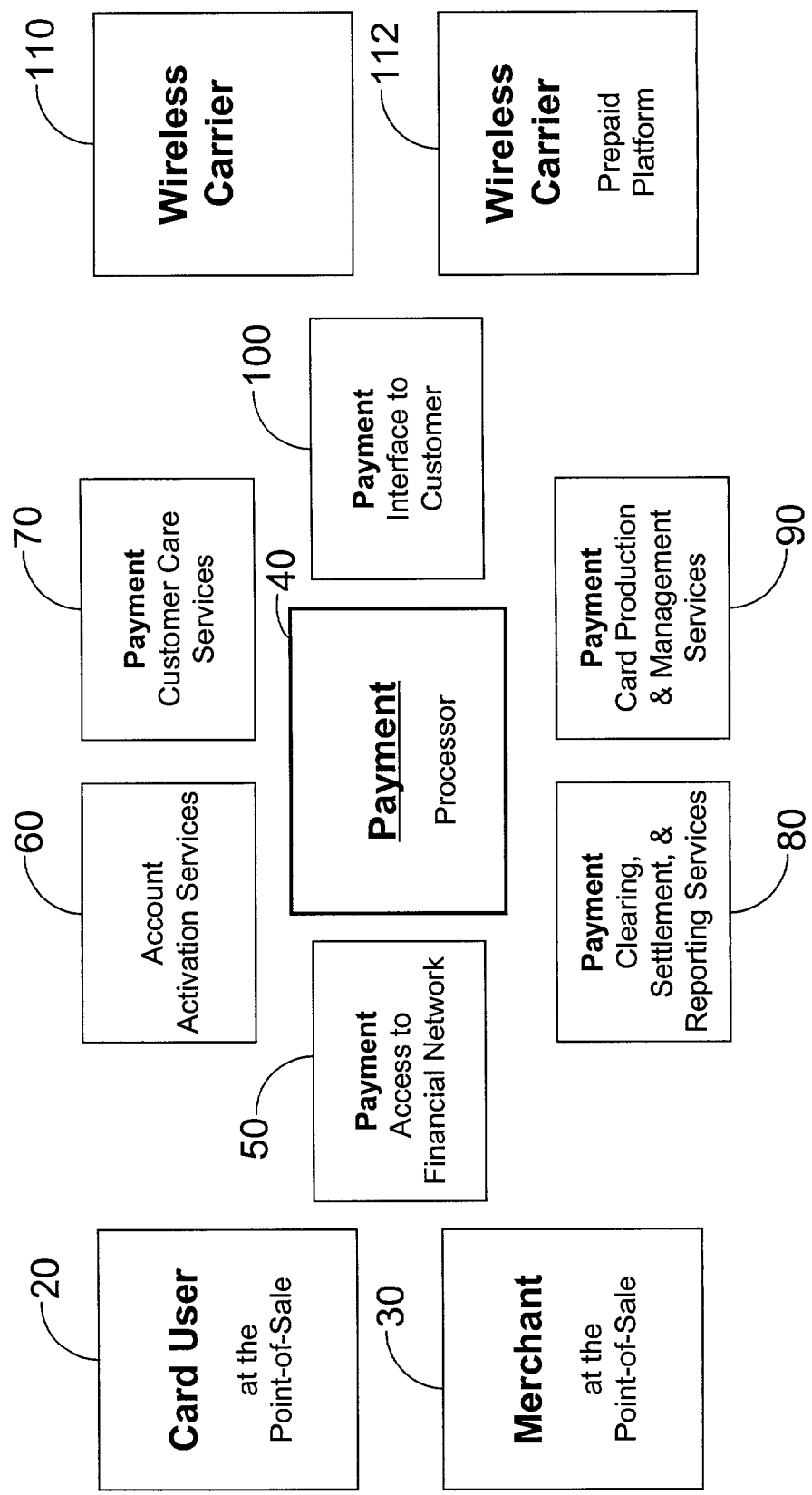
FIG. 1 is a block diagram introducing the various components involved in the system and methods of the present invention.

FIG. 1 illustrates the principle components of a system and methods according to the present invention to provide payment and related functionality for the purchase of wireless telecommunications services and other pre-paid goods and services. Referring to FIG. 1, a card user 20 represents a person who has or will establish one or more payment accounts according the invention. Card user 20 is illustrated as visiting at a point-of-sale. A point-of-sale can be a conventional "brick and mortar" retail merchant location, such as a store or restaurant. A point-of-sale for present purposes can also be an automated teller machine (ATM), a kiosk, touch-screen or other data terminal as further described herein at any location accessible to users.

In FIG. 1, the merchant 30 refers generically to the proprietor of a point-of-sale establishment, such as a convenience store or other merchant location. In general, merchant 30 refers an establishment where one or more point-of-sale terminals are installed so as to provide access to a financial network. For example, millions of retail establishments around the world today have installed small data terminals which are coupled to a financial network for communicating financial transaction information, either using a dial up modem or dedicated line. Typically, these terminals include a card reader that enables a merchant's employee to "swipe" a credit card whereupon the card reader reads the credit card account number for transmission over the financial network as part of a credit (or debit) card purchase transaction. According to the present invention, as further described later, the same type of terminal can be used instead to facilitate a payment transaction in which the cardholder delivers cash or other payment to the merchant at the point-of-sale for the purpose of "recharging" or adding value to an associated user account, for example a wireless carrier prepaid platform 112.

The heart of the present system is a payment processor 40, which can be conveniently implemented on a suitable general purpose digital computer programmed as explained in greater detail later. The principle features and functions of the payment processor, each of which will be described in greater detail in turn, include a means 50 for accessing an existing financial network to communicate financial transaction data; account activation services 60 for activating and maintaining intermediary accounts on the payment processor system; payment customer care services 70; payment clearing, settlement and reporting services 80; payment card production and management services 90 and means 100 for interfacing the payment processor system to a customer such as a wireless carrier prepaid platform 112.

It is critical to note that in this application, the cardholder or card user 20 is an individual (or business) who utilizes goods or services provided by a vendor such as the wireless carrier 110/112. The user account, which we also refer to as the end-user account, is maintained by the vendor such as the wireless carrier 110 on the vendor's prepaid platform 112. The end-user is not referred herein as a "customer." Rather, the "customer" of the present payment system is the provider of goods or services, such as wireless telecommunications services carrier 110, who, again, provides goods or services to the end-user. That vendor is a "customer" of the present payment system. The system is intended to serve the needs of multiple customers (each of which has its own universe of end-users). One important feature of the present system is that the customer interface 100 provides a standardized interface to enable numerous disparate "customers" to take advantage of the present system, providing a highly effective real time cost-efficient method for their end-users to pay for goods and services. The payment processor 40 maintains a database of cardholder accounts, each of which is "associated" with a corresponding "customer" or vendor end-user account, as further explained below.

Figure 2:
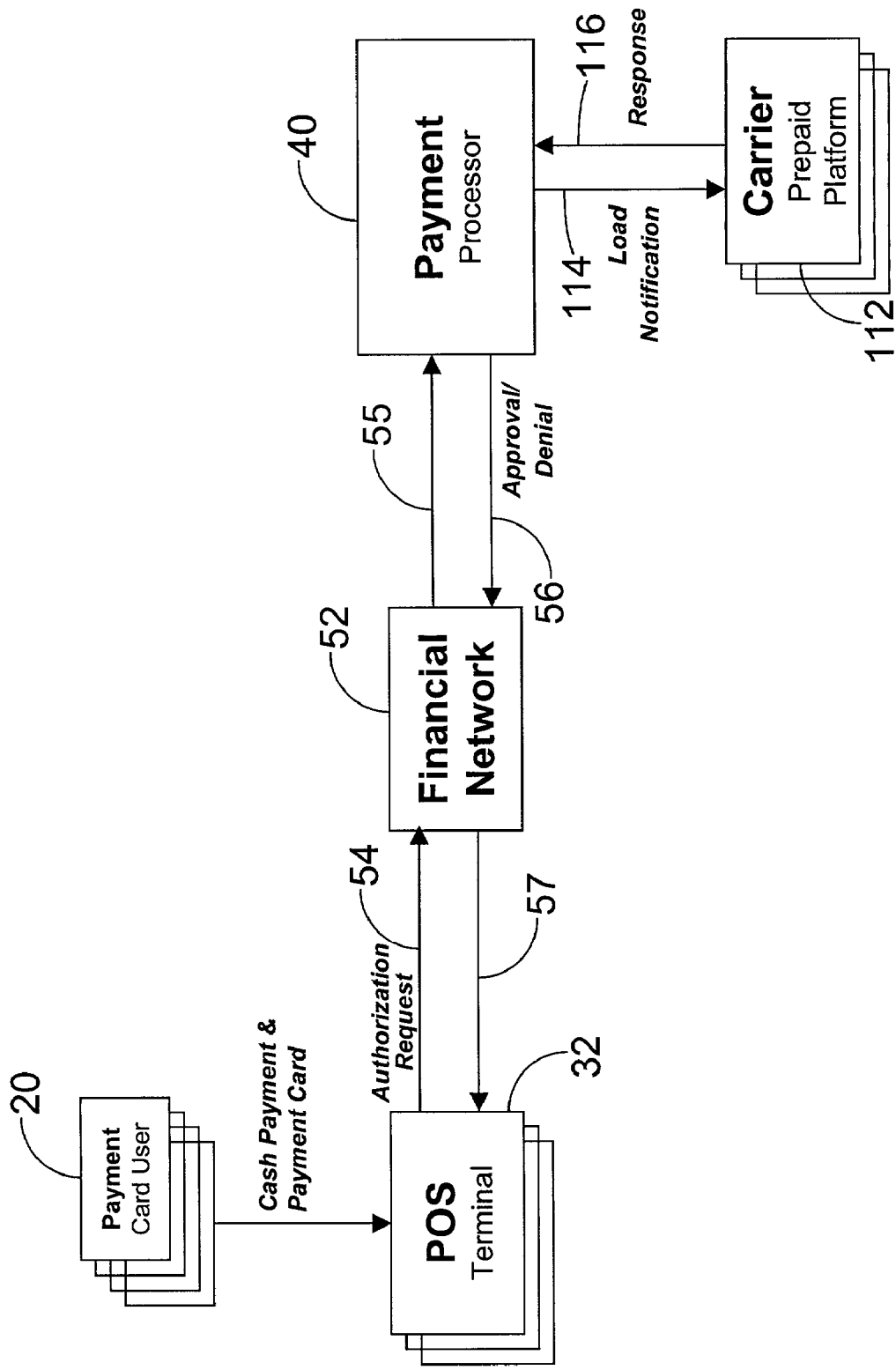
FIG. 2 is a flow chart illustrating a method for processing the recharge of an end-user account maintained on a prepaid platform, utilizing an intermediary payment processor system according to the invention.

FIG. 2 is a flow chart illustrating the basic method for processing a recharge transaction to add value to an end-user account maintained on a prepaid platform. We use prepaid wireless services as an illustrative example of a customer/vendor. The payment card user 20 visits a merchant of point-of-sale location where a point-of-sale terminal 32 is installed. The card user makes a payment to the merchant, for example in cash, and presents the user's account identifier. This refers to the intermediary account which is maintained on the pre-payment processor 40. It is not the same as the end-user account which would be maintained at the carrier's prepaid platform 112. The card user can present the intermediary account number by providing a physical card, in which case the merchant can swipe the card in the typical point-of-sale terminal to read the account number. Alternatively, it can be keyed into the POS terminal manually. The merchant also keys in the dollar amount of the payment and presses a key or a predetermined code to initiate an authorization request.

The payment to the merchant need not necessarily be made in cash. For example, the payment could be made using a credit card or a debit card. In that case, the same POS terminal 32 can be used in the conventional manner to effect the credit or debit card transaction. However the payment might have been received, the merchant then indicates the amount of the payment, as noted, and transmits through the terminal an authorization request 54 into the financial network 52. Financial network 52 corresponds to any of the existing card association networks currently in use, for example the VisaNet network. The POS terminal 32 can be directly connected to the financial network, or a plurality of individual terminals are sometimes congregated through a merchant hub (not shown), which in turn is communicates with the financial network. Various architectures for this connection are known in the prior art. It is also common for one or more point-of-sale terminals to be networked or otherwise coupled to a merchant host computer at the retail location. In addition, it is generally the case that the point-of-sale terminal (or merchant host/hub) communicate with an "acquiring processor" which in turn communicates to the card association network (52 in FIG. 2).

The present invention can be used over any of these network arrangements, as illustrated in FIG. 9.

In all cases, the authorization request message is routed to the payment processor 40 by using a bank identification number (BIN) that corresponds to the payment processor 40. The BIN is a 6-digit series of numbers that is used by bank card companies to identify their financial transactions. For example, American Express' (AmEx) range is 3xxxxx; Visa's range is 4xxxxx and MasterCard is 5xxxxx. A range of numbers is assigned to the processor of the present invention so that it appears to the financial services network as if it were a credit card issuer. Thus every intermediary account identifier maintained by the payment processor 40 includes a BIN for routing communications over the existing financial network to the processor. The processor 40 receives the transaction, processes it, and transmits an approval or denial message 56 via the financial network 52 through connection 57 back to the POS terminal 32. Assuming that the transaction is approved, the POS terminal can print a receipt and optionally print a duplicate—one for the card user and one for the merchant. These types of transactions traverse the existing financial network without difficulty because the card number and the transaction messages (e.g. authorization request/approval/denial) conform to bank card industry standards and protocols. A principle advantage of the present invention is that it leverages the worldwide existing financial network by using it for a new purpose and in a new way. Thus the functionality and features of the invention become available to users worldwide at minimal cost of implementation.

After the payment transaction between the payment processor 40 and the point-of-sale terminal 32 is completed, the processor 40 then provides a load notification signal 114 to the carrier prepaid platform 112. This load notification identifies the end-user account that corresponds to (having been previously associated with) the intermediary account number presented by the card user at the point-of-sale. The load notification message 114 also includes an amount by which the end-user account should be credited or "recharged." This amount is not necessarily the same as the amount of the payment made by the card user to the merchant, depending upon various fees, discounts, or promotional programs that may apply. In the case of telecom services, the credit may be denominated in air minutes rather than dollars. All of these considerations and options can be taken into account through suitable programming in the processor 40. The processor 40 preferably is coupled to the customer site, for example a carrier prepaid platform 112, via a high bandwidth data communications link, such as frame relay connection, to minimize delay. Accordingly, the end-user account is recharged in nearly "real time" after payment at the merchant point-of-sale. Thus, in the case of prepaid wireless services, where the cardholder's wireless account has been exhausted, that account will be "recharged" and telecommunication services available within seconds after payment is tendered to the merchant. The "check in the mail" delay is eliminated.

Figure 3:
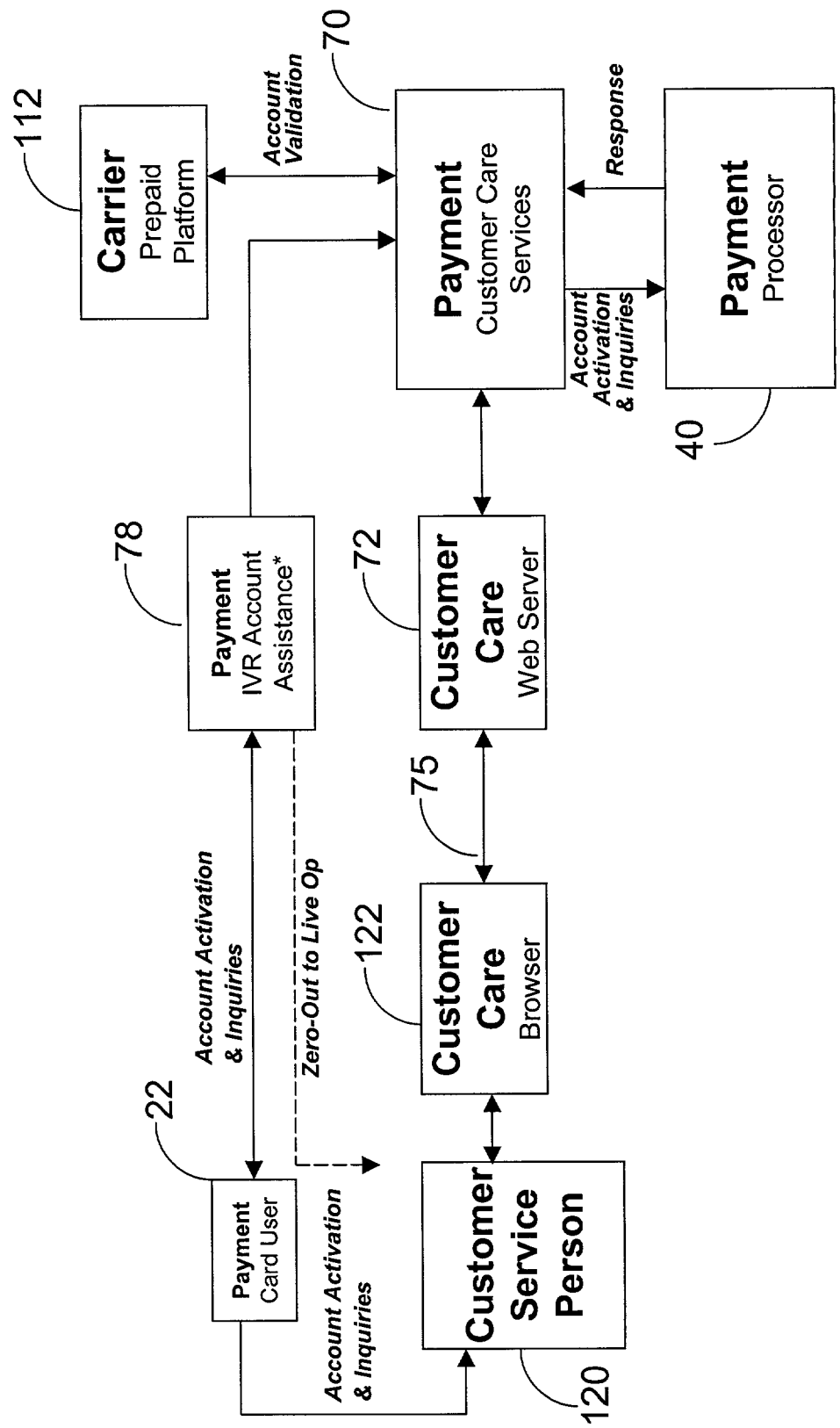
FIG. 3 is a flow chart illustrating a method for establishing account and processing customer inquiries through the intermediary payment processor Customer Care Services.
Figure 8:
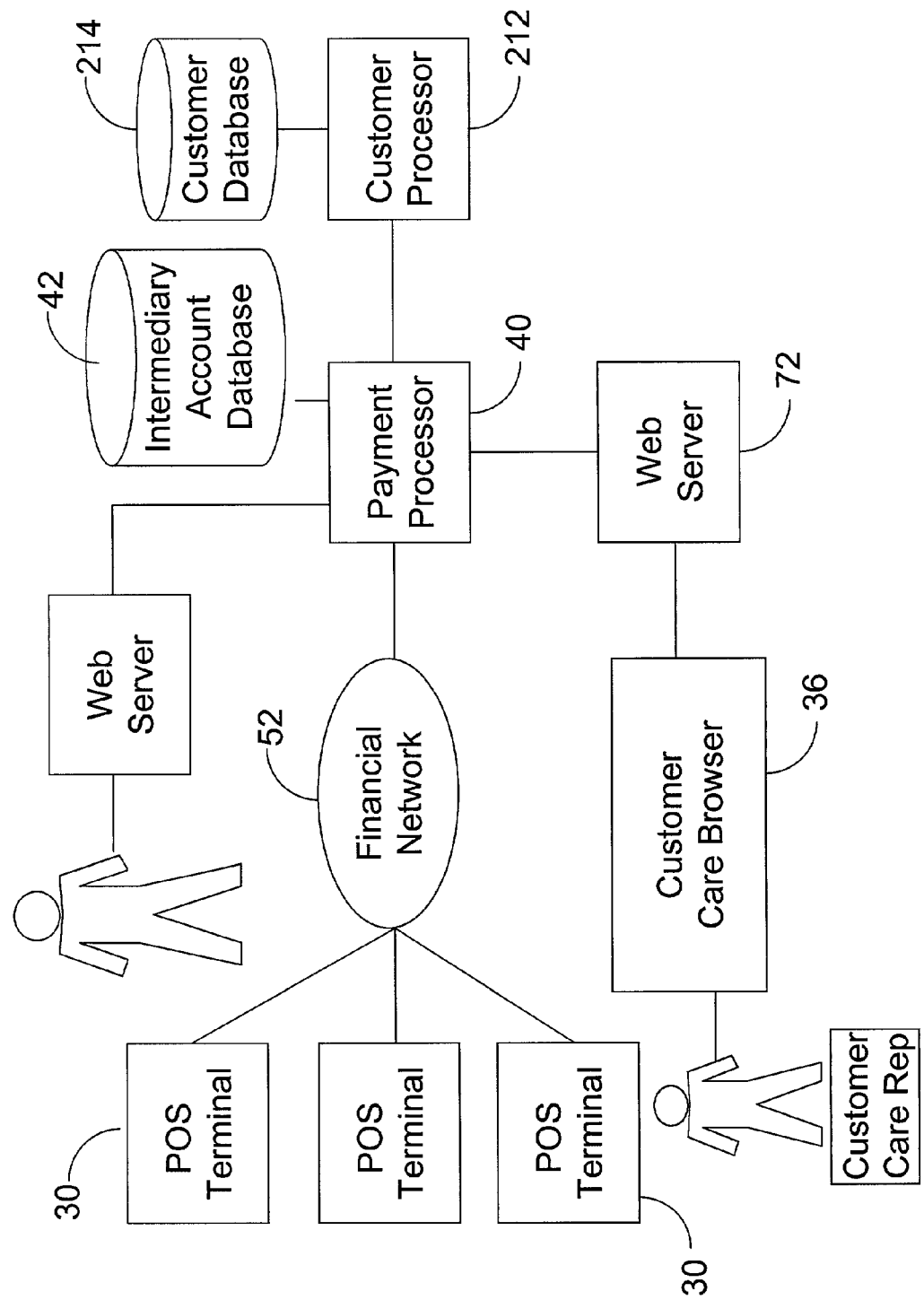
FIG. 8 is a block diagram illustrating the components involved in the communications between a customer, a merchant, the intermediary payment processor and an Internet merchant.
Figure 9A:
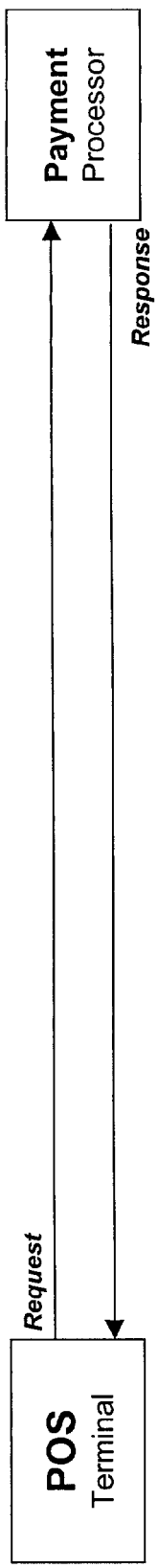
FIGS. 9A through 9D are a series of flow charts illustrating a method for communicating the recharge and authorization request to the intermediary payment processor.
Figure 9B:
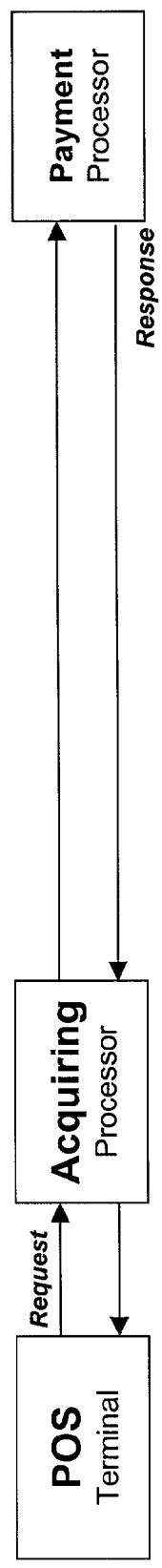
Figure 9C:
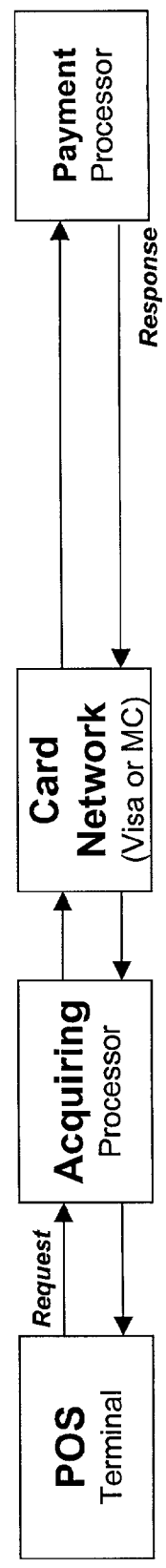
Figure 9D:
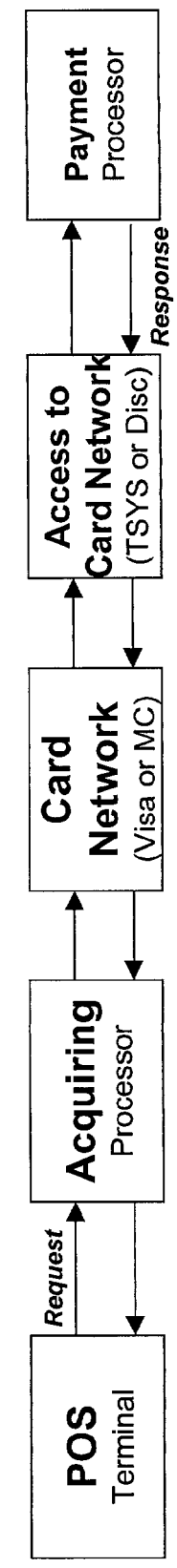

FIG. 3 is a flow chart illustrating methods for establishing an intermediary account and providing certain customer care services. To begin, a payment card user 22 contacts a payment account assistance module 78, which can be implemented as part of customer care services software 70 on the payment processor system 40 or on another platform that can communicate with the processor. The account assistance software can be implemented, for example, using interactive voice recognition (IVR) technology, which is commercially available. This customer service application 78 is accessed by the card user in order to activate his or her account, by associating the intermediary account (card number) with an end-user account that is maintained by a payment customer such as a wireless carrier prepaid platform 112. The card user accesses the customer service application 78 and is prompted to identify the customer (carrier) and/or the end-user account number. (The user account number often can be used to identify the carrier.) The customer service application 70 communicates with the prepaid platform 112 to confirm or validate the account number provided by the card user. Assuming that the account information is valid, the customer care services 70 then initiates account activation on the processor 40. Specifically, an account activation operation has the effect of associating the card number (the intermediary account identifier) with a selected prepaid platform (or other vendor) end-user account number. This association is reflected in an intermediary account database 42 maintained by the payment processor 40 as illustrated in FIG. 8. There is no necessity for the processor database to contain any personal information about the card user; it need not even include the card user's name. However, steps can be taken to provide security in order to prevent, for example, an unauthorized person from changing the association of an intermediary account from one vendor to another.

If the card user experiences difficulty in using the account assistance module 78 or simply prefers to talk with a live operator, they have the option to press zero, for example, to connect to a live operator 120. Alternatively, card user 22 can directly contact a customer service representative 120 at any time they wish to do so. In FIG. 3, the CSR 120 is a customer service representative of the vendor, for example the wireless services carrier (110 in FIG. 1) that is affiliated with the prepaid platform 112. The payment system customer care services 70 provides support to the carrier CSR 120 so that a customer service representative can conduct account activation and inquiries to the processor database. Preferably, the customer care services are provided through a customer care web server interface 72. The web server is non public. Rather, it is dedicated to providing a convenient interface to the carrier CSR through a customer care browser 122 executing on the carrier CSR's computer. The carrier (or other customer CSR) has only limited access and privileges on the processor system 40, as necessary to provide customer service to card users. For example, the carrier CSR would not be able to effect the equivalent of a payment transaction as that can be done only by a merchant as described above.

Figure 4:
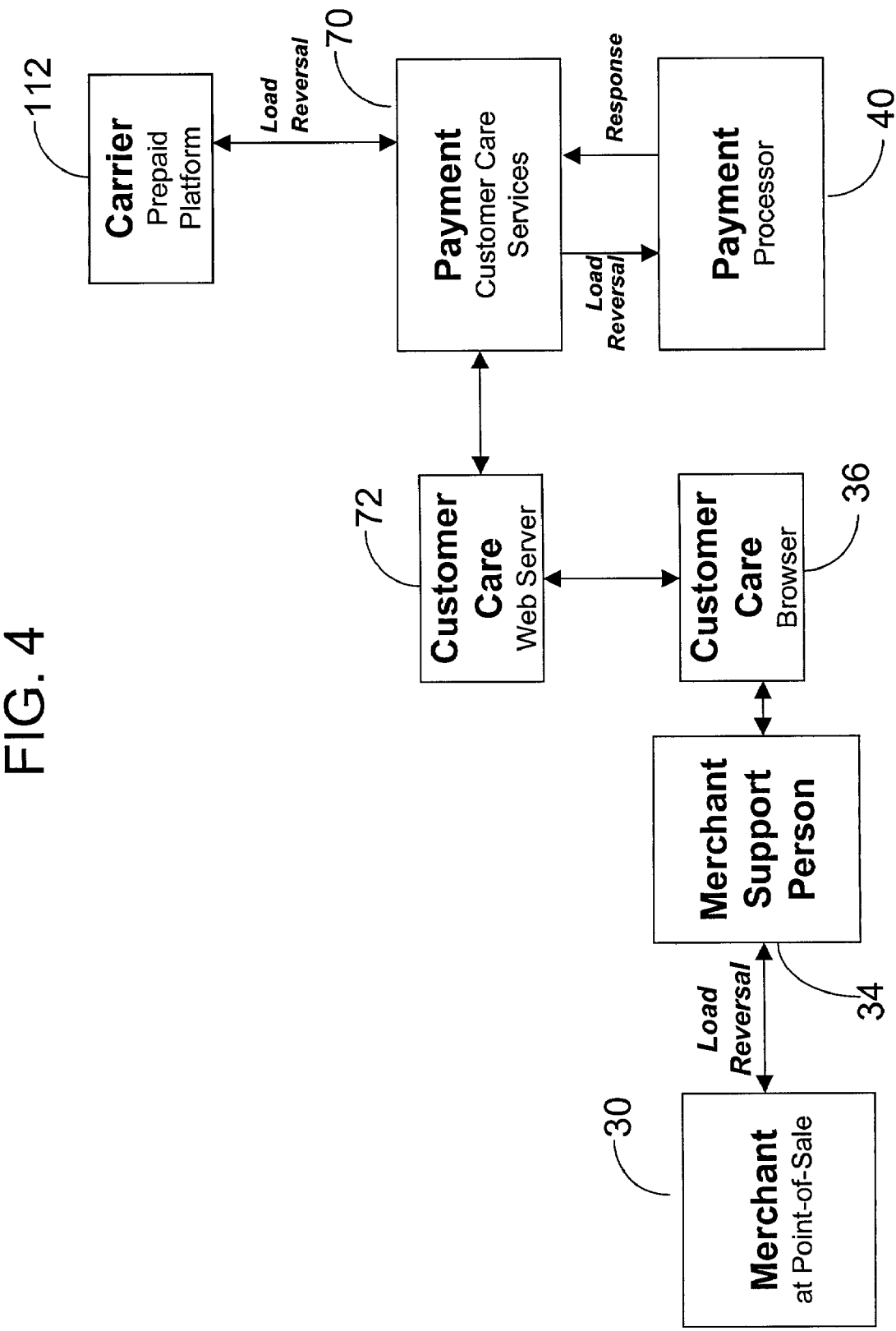
FIG. 4 is a flow chart illustrating a method for reversing unauthorized or improperly processed transactions.

FIG. 4 illustrates additional features of the payment customer care services application 70. Here, the customer care services include providing support to a merchant support operator 34. The point-of-sale merchant 30 contacts a merchant support operator 34 in the event that a load reversal transaction becomes necessary, for example, where a payment transaction was effected an error. The customer care services application 70 provides an interactive interface to the processor 40, which can be accessed by the merchant support operator 34. In a presently preferred embodiment, the customer care services includes a customer care web server application 72 so that the merchant support operator can conveniently access the processor through a customer care browser interface 36, such as a commercially available web browser operable on a personal computer. This way no special equipment is needed to provide quality support to participating merchants.

Customer Interface

Referring once again to FIG. 1, it shows a customer interface 100 for interfacing the processor to the customer platform. The reader is reminded that, throughout this document, "customer" refers to the payment processing system's customer, whereas "end-user" refers to the cardholder, which is to say the person that uses goods or services sold by the "customer." At least three transaction types are supported by the payment system customer interface: Account loading (charge/recharge), Account validation, and Load reversal.

Below is a description of each of the three transaction types and the payment processing that is associated with them.

1. Account loading. Account loading (aka account recharge) is a transaction which uses the payment card to add value to the end-user's account as it is stored at the customer database. Upon receipt of an account loading transaction, the payment system performs a series of verifications to determine if the transaction is valid. These verifications can include, for example, authentication of the payment account, assessing transactional velocity and limits, validation of merchant, and detection of duplicate transactions.

If the transaction passes the validation checks then the payment processor prepares the transaction for remote processing at the customer processor. The payment system identifies the customer, the customer platform, and the end-user account number based on the payment account number.

2. Account validation. Account validation is a transaction to verify that an end-user account number (e.g. a cell phone number) exists in the customer database. This transaction is performed when the end-user account number is being associated with the payment system (intermediary) account number. This transaction can be managed by either an interactive voice response (IVR) application that is running on a voice response unit (VRU) or through a live customer care representative accessing the PreCash processor through a web browser and a web server, as described above with reference to FIG. 3. Typically this transaction will occur only once per payment card (account) and only once per end-user.

3. Load reversal. Load reversal is a transaction to reverse the effects of a previously processed account loading transaction. This transaction is not designed to merely remove value from the balance associated with the end-user's account but to do so only to turn back the effects of an identified loading transaction that was previously processed against that account. Other requirements of this transaction type include that the load reversal must occur on the same day as the original account load transaction and the end-user account must have enough of a balance that the reversal amount can be subtracted from it. This transaction will be managed by a live customer care representative accessing the payment processor through a web browser and a web server, as described briefly above with reference to FIG. 4. This transaction is intended to provide merchants with the ability to reverse an erroneous transaction rather than to provide a refund to an unsatisfied end-user.

Communications.

Referring again to FIG. 2, the connection between the payment system (processor 40) and the customer can be a Frame Relay network 114 or some other secure link, 116 in a presently preferred embodiment, although various communications hardware and protocols can be used. The communications protocol over which the transaction message will be transmitted from the payment system to the customer can be, for example, TCP/IP. The customer may implement any mechanism qualified to receive and respond to a TCP/IP message including a TCP/IP server side socket.

Processing the Transaction at the Customer Processor

Each transaction type is processed in a different way by the customer processor. Once the transaction type is identified, the processing that is likely to occur at the customer processor is described below.

1. Account Loading. Lookup the cardholder's account based on the customer account number. Perform validation checks. Add the payment amount to the account balance. Log the transaction. Respond to payment processor.

2. Account Validation. Lookup the cardholder's account based on the customer account number. Log the transaction. Respond to the payment processor.

3. Load Reversal. Lookup the cardholder's account based on the customer account number. Perform validation checks. This will include the verification that the cardholder's account balance is at least the value to be subtracted from the balance. Subtract the amount of the previously processed transaction from the account balance. Log the transaction. Respond to the payment processor.

Batch Processing.

The payment system can be programmed to support batch processing. In a batch processing system, the customer will have available only a subset of the functionality that was described above. The following limitations can be expected in a batch environment:

1. Delayed load transactions. As is the asynchronous nature of batch processing, any updates to the end-user account balance will experience a delay.

2. No account validation. The effectiveness of the account validation transaction type is eliminated in a batch processing environment. Therefore, this transaction type will be unavailable.

3. Limited load reversal transactions. It is a requirement of the load reversal transaction type that the end-user have an account balance of at least the amount to be reversed. This cannot be verified in a batch environment.

Nonetheless, many of the essential advantages of the present invention can still be achieved with a batch processing arrangement.

Settlement and Clearing.

Figure 5:
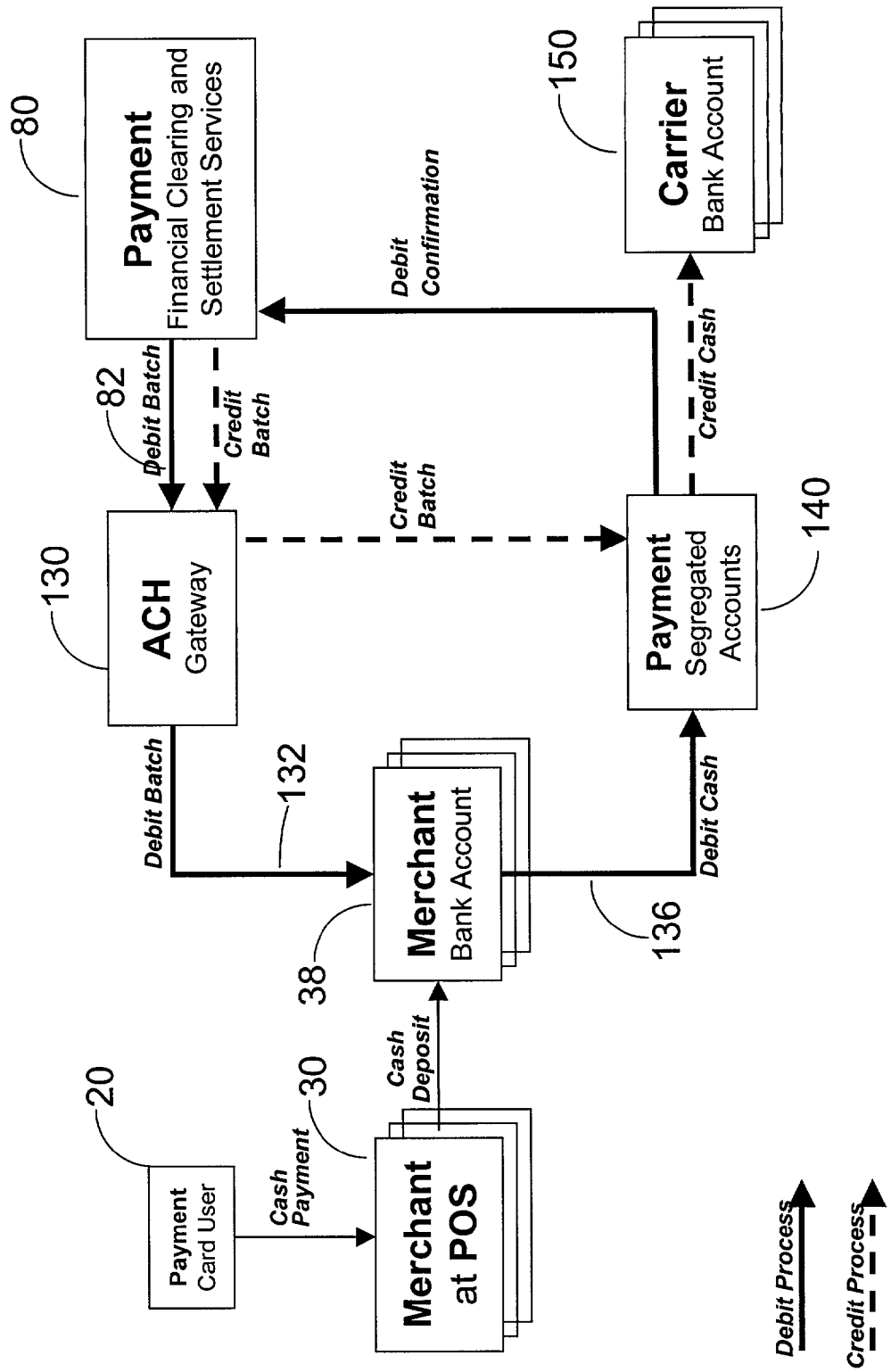
FIG. 5 is a flow chart illustrating a method for the financial settlement and clearing of payments made by the the intermediary payment processor card user for wireless telecommunications services.

FIG. 5 illustrates clearing and settlement processing according to the present invention. As described earlier, a card user 20 makes a cash payment to a merchant at a point-of-sale, and the merchant subsequently deposits the cash into the merchant's bank account 38. The payment transaction is logged in the payment processor 40 database (not shown). At the end of the processing day, the processor aggregates all of the loading (payment) transactions for the day based on merchant and batches them into a file. This function is carried out by the payment financial clearing and settlement services application 80, which may be implemented in software as a part of the processor system. This debit batch file 82 is submitted to the automated clearing house (ACH) Gateway 130 for processing. The ACH Gateway 130 in turns transmit this information to the federal reserve which in turn debits funds from the merchant's bank account 38 and in turn credits the funds to the pre-payment processor's bank account 140. Thus, the payment processor system performs various accounting functions and provide a clearing data that enables the settlement process to occur via the electronic transfer of funds from merchant bank accounts to the pre-payment processor bank accounts. Once the payment processor reconciles these transfers with transaction activities records to ensure that accurate funds were secured, funds are then forwarded onto the bank accounts of the corresponding customers. Several days may elapse between transaction activity and the actual transfer of funds into the customer's bank account, in which time the processing and reconciliation will occur. Periodic statements summarizing daily activity and associating that activity with subsequent fund transfers can be prepared by the processor and provided to the customers and merchants.

Reporting Functions.

Figure 6:
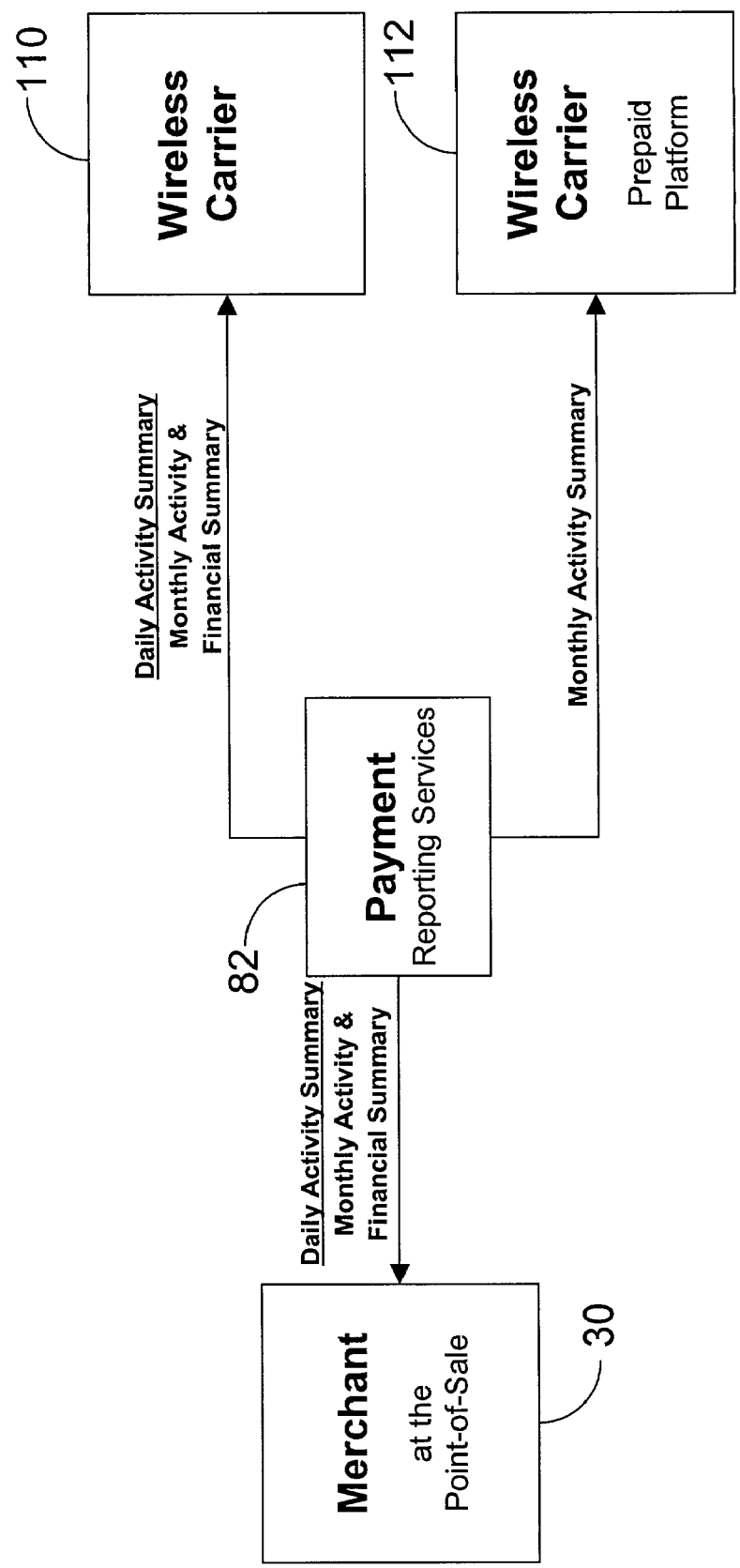
FIG. 6 is a flow chart illustrating a method for reporting the daily and monthly activity of the end-user, the merchant and the wireless carrier.

FIG. 6 illustrates these reporting activities and a presently preferred embodiment. Referring to FIG. 6, the payment reporting services 82 provide a daily activity summary to the POS merchant 30, and can also provide periodic, for example monthly, activity and financial summary information. Second, a payment reporting services provide daily activities summaries to its customer, for example the Wireless Carrier 110, and can also provide periodic activity and financial summaries. Finally, as illustrated in FIG. 6, reporting services 82 can provide periodic activity summaries to the wireless carriers prepaid platform vendor 112.

Card Production and Management Services

Figure 7:
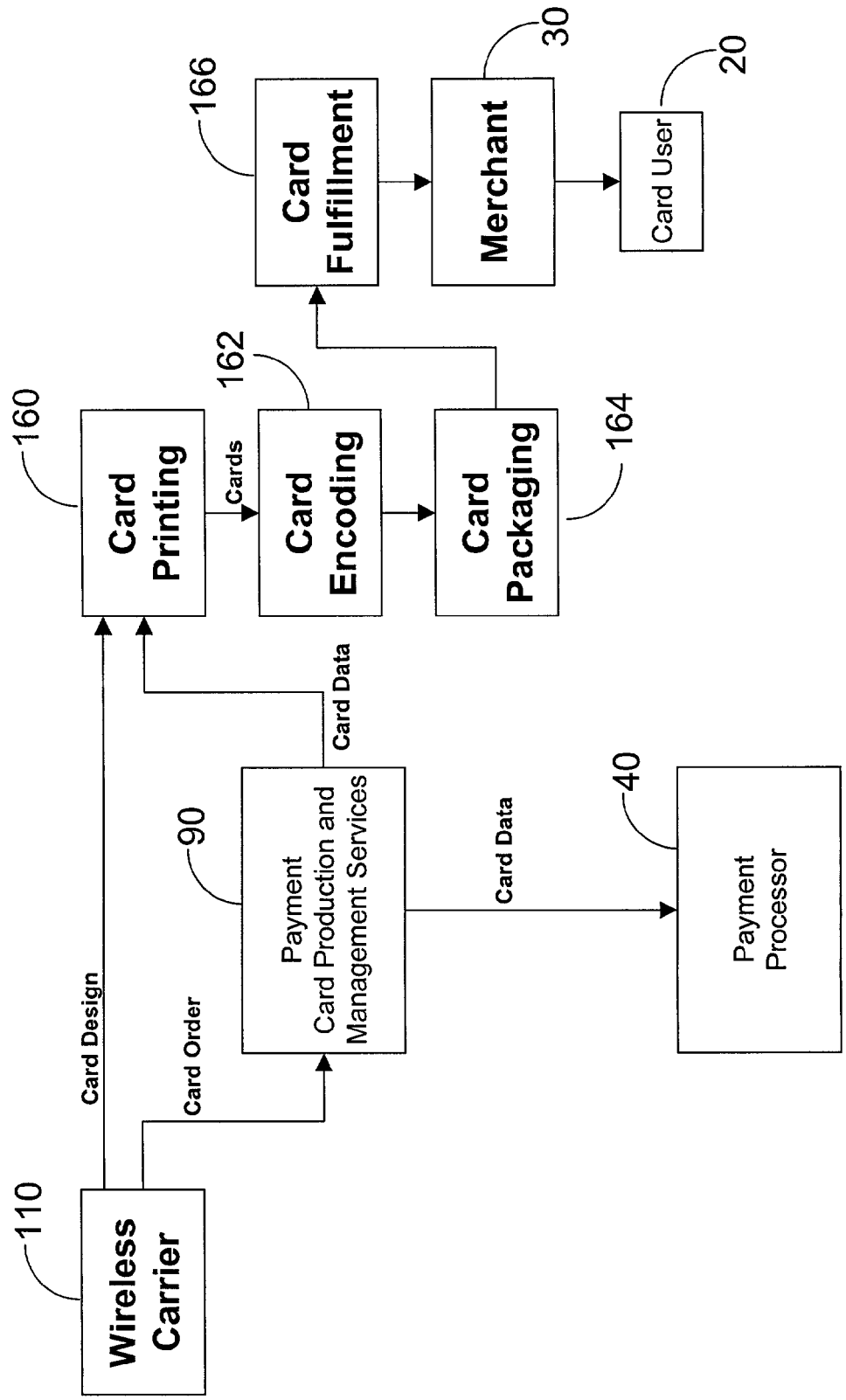
FIG. 7 is a flow chart illustrating a method for the ordering, production and distribution of the intermediary payment processor card.

FIG. 7 illustrates the card production and management services.

It will be obvious to those having skill in the art that many changes may be made to the details of the above-described embodiment of this invention without departing from the underlying principles thereof. The scope of the present invention should, therefore, be determined only by the following claims.

The invention claimed is:

1. A method for effecting electronic payment, comprising:
    associating an intermediary account number and an end-user account number, provided by the end-user, in a payment processor computer system;
    conducting a payment transaction between an end-user and a terminal located at a point-of-sale including communicating a payment and the intermediary account number from the end-user to the terminal;
    sending data indicative of the payment and the intermediary account number from the terminal to the payment processor computer system;
    determining the end-user account number associated with the intermediary account number;
    sending data indicative of the payment and the retrieved end-user account number to a service provider system; and
    instructing the service provider system to credit an end-user account identified by the retrieved end-user account number, wherein the service provider system maintains the end-user account.

2. A method according to claim 1, further comprising:
    transferring a first amount of money equal to the payment, subject to adjustment, from a first bank account maintained by a merchant into a second bank account associated with the payment processor computer system, by an electronic funds transfer.

3. A method according to claim 2 further comprising:
    transferring a second amount of money equal to the payment, subject to adjustment, from the second bank account associated with the payment processor computer system into a third bank account, maintained by the service provider, by electronic funds transfer.

4. The method of claim 2, wherein transferring the first amount further comprises:
    debiting the merchant's first bank account and crediting the payment processor computer system's second account under control of the payment processor computer system.

5. A method according to claim 2, wherein transferring the first amount of money equal to the payment, subject to adjustment, is carried out in a batch mode on a daily basis.

6. A method according to claim 2, wherein transferring the first amount of money equal to the payment, subject to adjustment is carried out via an automated clearing house system (ACH).

7. A method according to claim 2, wherein said payment from the end-user at the point-of-sale includes payment in the form of cash.

8. A method according to claim 2, wherein said payment from the end-user at the point-of-sale includes payment as a debit card transaction.

9. A method according to claim 2, further comprising:
    issuing a card to the end-user that includes the intermediary account number.

10. A method according to claim 2, wherein the end-user account number includes a valid credit card account number.

11. A method according to claim 10, wherein the valid credit card account number can be presented by the end-user at the terminal located at the point-of-sale to purchase goods and services.

12. A method according to claim 2, wherein the end-user account number identifies a pre-paid cellular phone account.

13. A method according to claim 2, wherein the service provider is a prepaid telecommunications platform operator.

14. A method according to claim 2, wherein the end-user account number includes a prepaid debit account number.

15. The method of claim 14, wherein the prepaid debit account number is associated with a debit card which may be presented at the terminal located at the point-of-sale to purchase goods and services.

16. A method according to claim 2, wherein the terminal located at the point-of-sale comprises an automated teller machine (ATM).

17. A method according to claim 2, wherein the terminal located at the point-of-sale comprises a vending machine.

18. A method according to claim 2, wherein the terminal located at the point-of-sale is a merchant hub that is communicably coupled to the terminal and the payment processor computer system.

19. The method of claim 2, wherein the terminal at the point-of-sale is a data terminal at any location accessible to the end-user.

20. A method according to claim 19, wherein the terminal is communicably coupled to the Internet, and the point-of-sale includes a website.

21. The method of claim 2, wherein sending data indicative of the payment and the intermediary account number from the terminal to the payment processing computer system, further comprises:
    sending the data over a financial network.

22. A method according to claim 21 wherein the financial network comprises a card association network.

23. A method according to claim 22 wherein the card association network uses a bank identification number for routing data to the payment processor computer system.

* * * * *